United States Patent
Koncelik, Jr.

(10) Patent No.: US 6,631,712 B2
(45) Date of Patent: Oct. 14, 2003

(54) AQUATIC BARBECUE ASH EXTINGUISHER AND REMOVER

(76) Inventor: Lawrence J Koncelik, Jr., 10 Gingerbread La., East Hampton, NY (US) 11937

( * ) Notice: Subject to any disclaimer, the term of this patent is extended or adjusted under 35 U.S.C. 154(b) by 0 days.

(21) Appl. No.: 09/907,176

(22) Filed: Jul. 18, 2001

(65) Prior Publication Data

US 2003/0015187 A1 Jan. 23, 2003

(51) Int. Cl.[7] .................................................. F24B 3/00
(52) U.S. Cl. .................. 126/25 C; 126/25 R; 126/242; 126/245; 431/3
(58) Field of Search .......................... 110/171; 126/242, 126/245, 243, 25 R, 41 R, 39 R, 25 C, 51; 431/3; 134/104.2, 22.1, 22.12, 200; 122/390, 391, 392, 405; 141/331–343

(56) References Cited

U.S. PATENT DOCUMENTS

| | | | |
|---|---|---|---|
| 1,045,359 A | * | 11/1912 | Babbitt, Jr. |
| 1,055,311 A | * | 3/1913 | Blount |
| 1,095,504 A | * | 5/1914 | Jannoch ...................... 248/318 |
| 3,033,191 A | * | 5/1962 | Bonadiman |
| 3,126,881 A | * | 3/1964 | Blotsky, Jr. |
| 3,209,743 A | * | 10/1965 | Stewart et al. |
| 3,854,242 A | * | 12/1974 | Gladstein .................... 248/318 |
| 4,229,904 A | * | 10/1980 | Burton ..................... 47/58.1 R |
| 4,763,640 A | | 8/1988 | Schnack et al. |
| 4,879,990 A | | 11/1989 | Clark |
| 4,895,134 A | * | 1/1990 | Fielding et al. |
| 4,909,137 A | * | 3/1990 | Brugnoli |
| 4,995,137 A | | 2/1991 | Reichborn |
| 5,044,266 A | | 9/1991 | Geogaris |
| 5,052,149 A | * | 10/1991 | Johnson ................... 222/181.3 |
| 5,353,880 A | * | 10/1994 | Green |
| 5,511,535 A | * | 4/1996 | Landstrom et al. |
| 5,713,265 A | * | 2/1998 | Strader et al. |
| 5,799,595 A | | 9/1998 | Michelbrink et al. |
| 6,098,229 A | | 8/2000 | Ward |
| 6,158,426 A | | 12/2000 | Wardell |
| 6,167,797 B1 | | 1/2001 | Bollich |
| 6,182,559 B1 | | 2/2001 | Chiang |

* cited by examiner

*Primary Examiner*—Carl D. Price
(74) *Attorney, Agent, or Firm*—Michael I Kroll

(57) ABSTRACT

The present invention 10 discloses a barbecue ash discharge system comprised of a funnel-like device 18 having a length of outlet conduit 22 suspended under a barbecue grill 16 having a vent forming an outlet aperture 42 in the barbecue grill housing. The present invention provides for a plurality of methods for suspending the funnel-like device 18 under the barbecue grill 16 that may be dependent upon the support structure for the barbecue grill. A first funnel-like device 18 has a funnel harness with a plurality of straps 30 having hooks 34 positioned on the distal ends of the straps whereby the funnel is suspended beneath the barbecue grill 16 by attaching the hooks 34 to the lip 32 of the barbecue grill 16. A second funnel-like device has a flange 54 extending around the periphery thereof whereby a plurality of butterfly clips or the like 52 can be frictionally attached to the legs 50 of the barbecue grill 16 with the jaws 56 of the clips 52 engaging the funnel-like flange 54. A third funnel-like device has a rigid wire support ring member 60 forming an integral part of the rim of the enlarged end of the funnel-like 18 device. Extending from and attached to the wire support ring member 60 are a plurality of hooks 58 that frictionally engage the legs 50 of the barbecue grill. The present invention 10 additionally provides for a selectively removable screening element 46 that can be placed within the cavity of the funnel-like device to prevent clumping and discharge of large particles within the water ash slurry.

9 Claims, 12 Drawing Sheets

AQUATIC BARBECUE ASH EXTINGUISHER AND REMOVER

BACKGROUND OF THE INVENTION

Field of the Invention

The present invention relates generally to a barbecue and more specifically to the discharge of the ash material contained within a barbecue as fertilizer to a user-designated area. The discharge is accomplished by introducing a quantity of water into the barbecue grill where the ash will be suspended in solution and delivered by means of conduit to a user specified area.

The barbecue ash discharge system of the present invention is comprised of a funnel-like device having a length of conduit suspended under a barbecue grill having a vent forming an aperture in the barbecue grill housing.

The funnel-like device has a diametric opening extending beyond the one or more aforementioned barbecue grill housing apertures constricting to a tube having a length of conduit attached thereto.

The present invention provides for a plurality of methods for suspending the funnel-like device under the barbecue grill that may be dependent upon the support structure for the barbecue grill. The method of suspension may also incorporate additional structural elements into the funnel-like device to aid in the attachment of said device to existing barbecue grills.

A first funnel-like device has a funnel harness with a plurality of straps having hooks positioned on the distal ends of said straps whereby the funnel is suspended beneath the barbecue grill by attaching said hooks to the lip of the barbecue grill.

A second funnel-like device has a flange extending around the periphery whereby a plurality of butterfly clips can be frictionally attached to the legs of the barbecue grill with the jaws of the clips engaging the funnel-like flange.

A third funnel-like device has a rigid wire support member forming an integral part of the rim of the funnel-like device. Extending from and attached to the wire support member are a plurality of hooks that frictionally engage the legs of the barbecue. The frictional attaching methods are for those barbecue grills having divergent leg members whereby the funnel-like device will position itself at a point preventing further displacement due to the diverging leg members.

The present invention additionally provides for a selectively removable screening element that can be placed within the cavity of the funnel-like device to prevent clumping and discharge of large particles within the water ash slurry.

While other barbecue devices may be suitable for the purposes for which they were designed, they would not be as suitable for the purposes of the present invention, as hereinafter described.

SUMMARY OF THE PRESENT INVENTION

The present invention discloses a barbecue ash discharge system comprised of a funnel-like device having a length of outlet conduit suspended under a barbecue grill having a vent forming an outlet aperture in the barbecue grill housing. The present invention provides for a plurality of methods for suspending the funnel-like device under the barbecue grill that may be dependent upon the support structure for the barbecue grill. A first funnel-like device has a funnel harness with a plurality of straps having hooks positioned on the distal ends of the straps whereby the funnel is suspended beneath the barbecue grill by attaching the hooks to the lip of the barbecue grill. A second funnel-like device has a flange extending around the periphery thereof whereby a plurality of butterfly clips or the like can be frictionally attached to the legs of the barbecue grill with the jaws of the clips engaging the funnel-like flange. A third funnel-like device has a rigid wire support ring member forming an integral part of the rim of the funnel-like device. Extending from and attached to the wire support ring member are a plurality of hooks that frictionally engage the legs of the barbecue grill. The present invention additionally provides for a selectively removable screening element that can be placed within the cavity of the funnel-like device to prevent clumping and discharge of large particles within the water ash slurry.

A primary object of the present invention is to provide a device whereby the combustion remnant of a barbecue grill can be selectively delivered to a designated area as a fertilizer.

Another object of the present invention is to provide a barbecue grill water ash slurry distribution device.

Another object of the present invention is to provide a barbecue grill water ash slurry distribution device that can channel the water ash slurry to a user designated area.

Another object of the present invention is to provide a barbecue ash distribution device having a funnel-like device suspended beneath the barbecue grill housing vent aperture.

Another object of the present invention is to provide a barbecue ash distribution device having a funnel-like device with a length of conduit attached thereto.

Another object of the present invention is to provide a barbecue ash distribution device having suspension members whereby the funnel-like device can be positioned beneath the barbecue grill.

Another object of the present invention is to provide a barbecue ash distribution device having suspension members comprising a harness and straps having hook-like elements fixedly positioned to the distal end of said straps that will engage the housing of the barbecue grill and thereby suspend the funnel-like device beneath the barbecue housing grill.

Another object of the present invention is to provide an additional element for the funnel-like device in the form of a flange positioned circumferentially around the opening of the funnel-like device.

Another object of the present invention is to provide a barbecue ash distribution device having suspension members comprising a plurality of a butterfly clips for engaging the flange of the funnel-like device whereby said butterfly clips will suspend the funnel-like device beneath the barbecue grill by frictionally engaging the support members of the barbecue grill.

Another object of the present invention is to provide an additional element for the funnel-like device in the form of a rigid wire reinforcement member positioned circumferentially around the opening of the funnel-like device forming an integral part therewith and having a plurality of hook-like appendages extending therefrom.

Another object of the present invention is to provide a barbecue ash distribution device having suspension members comprising a plurality of hook-like appendages extending from the funnel-like device whereby said hook-like appendages will provide for the suspension of the funnel-like device beneath the barbecue grill by frictionally engaging the support members of the barbecue grill.

Another object of the present invention is to provide for an additional element for the funnel-like device in the form of a removable screen element that can be positioned within the funnel like device to prevent the passage of clumped ash or large particle matter.

Another object of the present invention is to provide a conical shaped screen element that can be positioned within the funnel like device to prevent the passage of clumped ash or large particle matter.

Additional objects of the present invention will appear as the description proceeds.

The present invention overcomes the shortcomings of the prior art by providing a device for the discharge of the ash material contained within a barbecue as fertilizer to a user designated area. The device is comprised of a funnel-like device having a length of conduit attached thereto that is suspended under a barbecue grill having a vent forming an aperture in the barbecue grill housing.

The funnel-like device has a large diametric opening extending beyond the barbecue grill housing apertures and constricts to a tube having a length of conduit attached thereto.

The distribution device of the present invention provides for a plurality of methods for suspending the funnel-like device under the barbecue grill. The method of suspension may also incorporate additional structural elements into the funnel-like device to aid in the attachment of said device to existing barbecue grills.

One method of attachment is comprised of a funnel harness with a plurality of straps having hooks positioned on the distal ends of said straps whereby the funnel is suspended beneath the barbecue grill by attaching the hooks to the lip of the barbecue grill.

An additional method is provided whereby the funnel-like device has a circumferentially flange extending around the periphery opening whereby a plurality of butterfly clips can be frictionally attached to the legs of the barbecue grill with the jaws of the clips engaging the funnel-like flange.

Another additional method is provided consisting of a rigid wire support member forming an integral part of the rim of the funnel-like device. Extending from and attached to the wire support member are a plurality of hooks that frictionally engage the legs of the barbecue.

The present invention additionally provides for a selectively removable screening element that can be placed within the cavity of the funnel-like device to prevent clumping and discharge of large particles within the water ash slurry.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
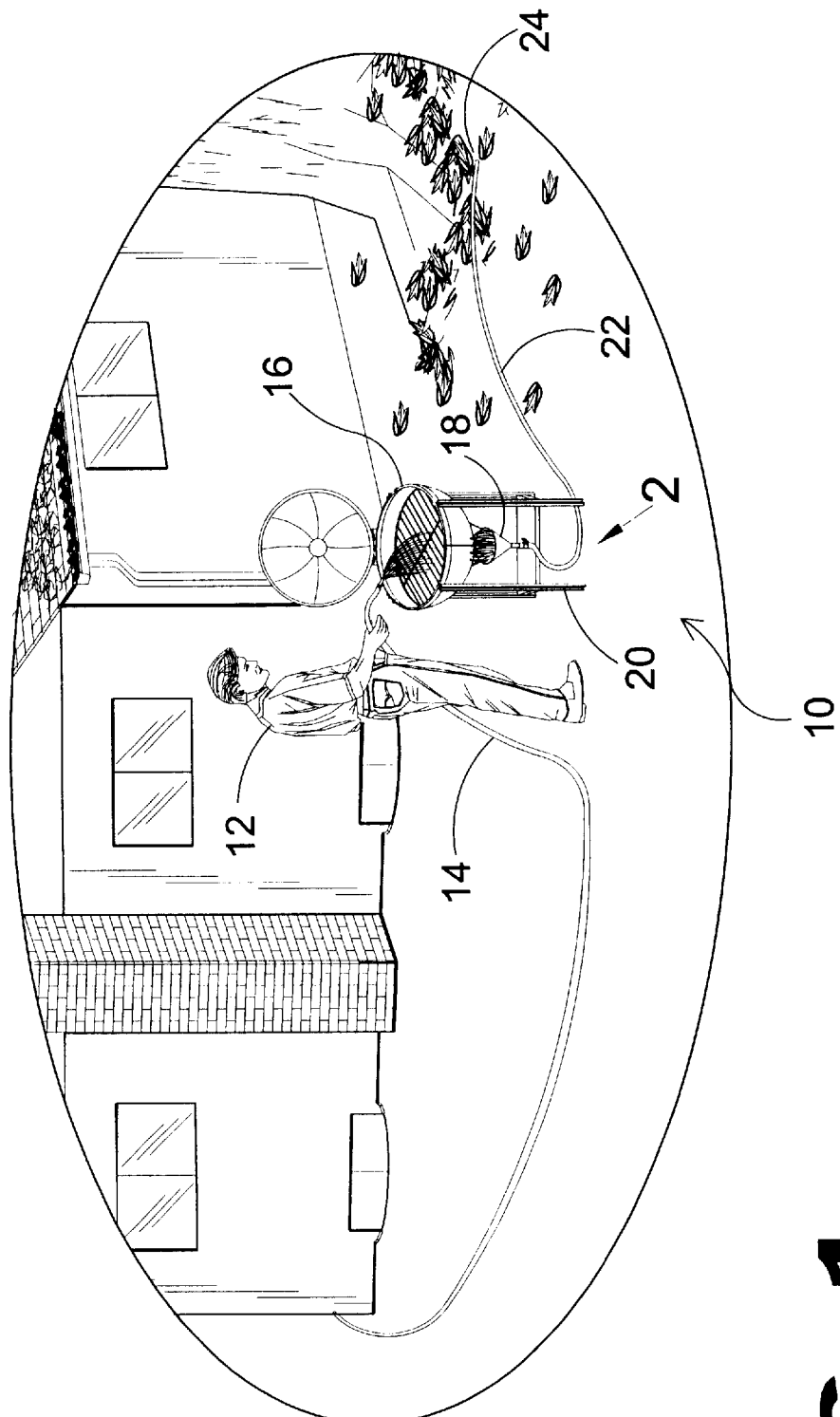
FIG. 1 is a perspective view of the present invention in use.

With regard to reference numerals used, the following numbering is used throughout the drawings.

10 present invention
12 user
14 inlet hose
16 grill
18 funnel
20 legs
22 outlet hose
24 lawn
26 grill cover
28 water
29 discharge
30 funnel harness
32 lip of grill
34 hooks
36 means for connection
38 direction arrow
40 ashes
42 air duct holes
44 larger pieces of coal ash
46 screen
48 loop means
50 tripod leg
52 clip means
54 flange of funnel
56 jaws
58 hooks
60 ring

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is a perspective view of the present invention 10 in use. The aquatic barbecue hot ash extinguisher and remover of the present invention 10, operates by a user 12 spraying water from a garden hose 14 onto the charcoal ashes. The resultant ash and water solution is washed out through the air duct holes at the bottom of the grill 16 and into a funnel 18 that is suspended between the grills legs 20. The water and ash solution washes out through the funnel 18 and into an outlet hose 22 that leads away from the grill and onto the lawn 24 or into the garden. When the water drains away, the spoil that is left is potash (potassium) that fertilizes the lawn or garden where it is discharged.

Figure 2:
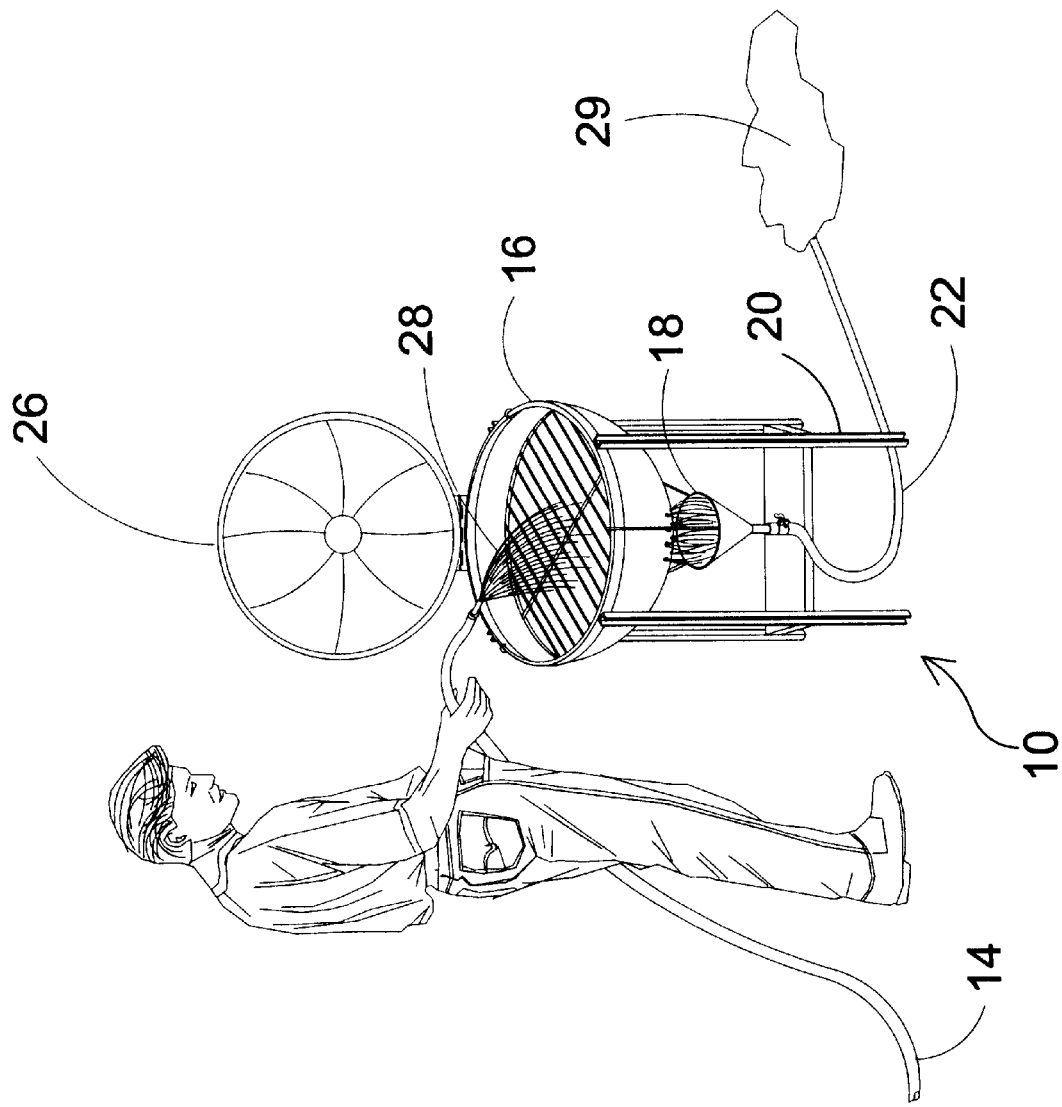
FIG. 2 is a perspective view of the present invention.

Turning to FIG. 2, shown therein is a perspective view of the present invention 10. The present invention 10 provides a solution to the problem of disposing of barbecue ashes by providing a device that will funnel a slurry of water and ash to a predetermined location. Varying the amount of water will determine the concentration and coverage of the mixture. The aquatic barbecue hot ash extinguisher and remover of the present invention 10, operates by a user 12 spraying water 28 from a inlet water source garden hose 14 onto the charcoal ashes remaining internal the grill 16. The resultant ash and water solution is washed out through the air duct holes at the bottom of the grill 16 and into a funnel 18 having an enlarged inlet end and a smaller outlet end that is suspended between the grills legs 20. The water and ash solution washes out through the funnel 18 and into an outlet hose 22 that leads the discharge 29 away from the grill and onto the lawn 24 or into the garden. Also shown is grill cover 26.

Figure 3:
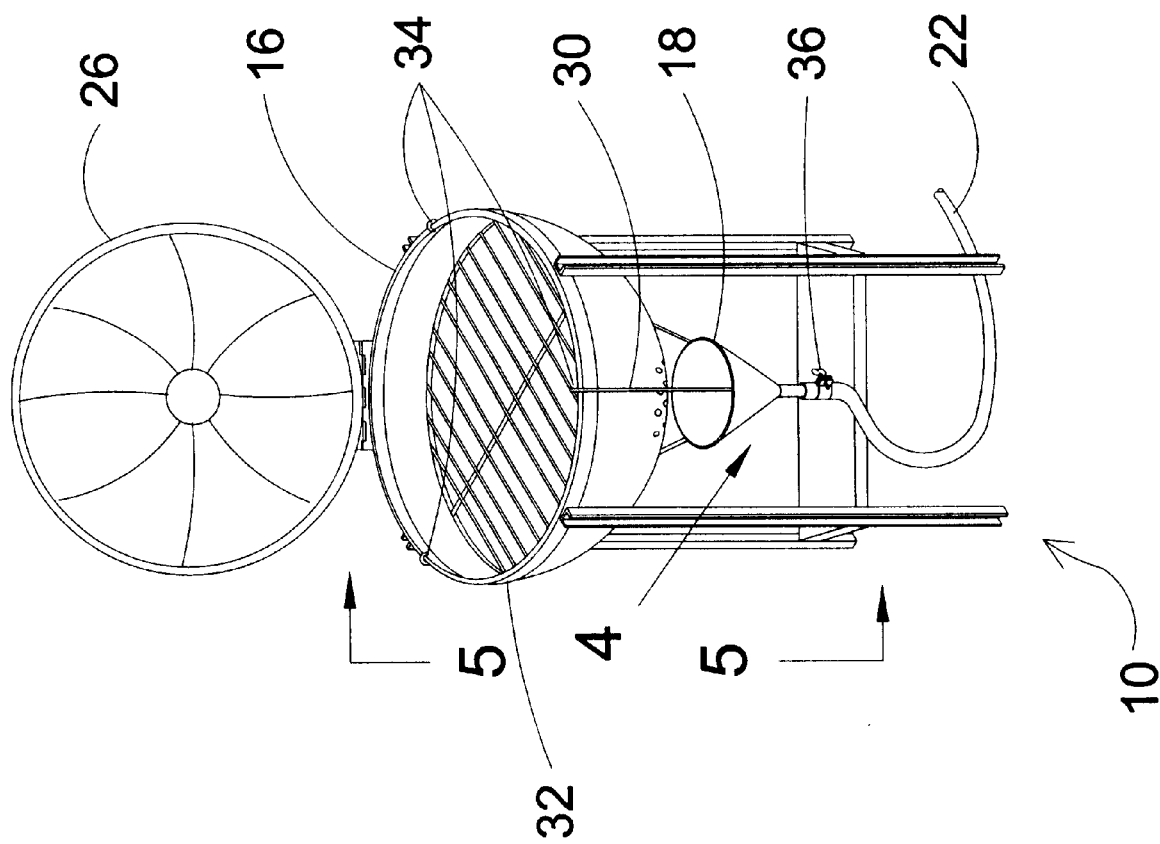
FIG. 3 is a perspective view of the present invention.

Turning to FIG. 3, shown therein is a perspective view of the present invention 10. The funnel harness 30 attaches to the lip 32 of the open barbecue unit, by means of three funnel harness hooks 34 attached to the ends of the funnel harness. At the other end of the harness 30, hangs the funnel 18. The harness hooks 34 are designed so that when the barbecue cover is closed, the hooks are not in the way. Also shown are the barbecue grill 16, grill cover 26, outlet hose 22, and means for connecting 36 the outlet hose to the funnel 18.

Figure 4:
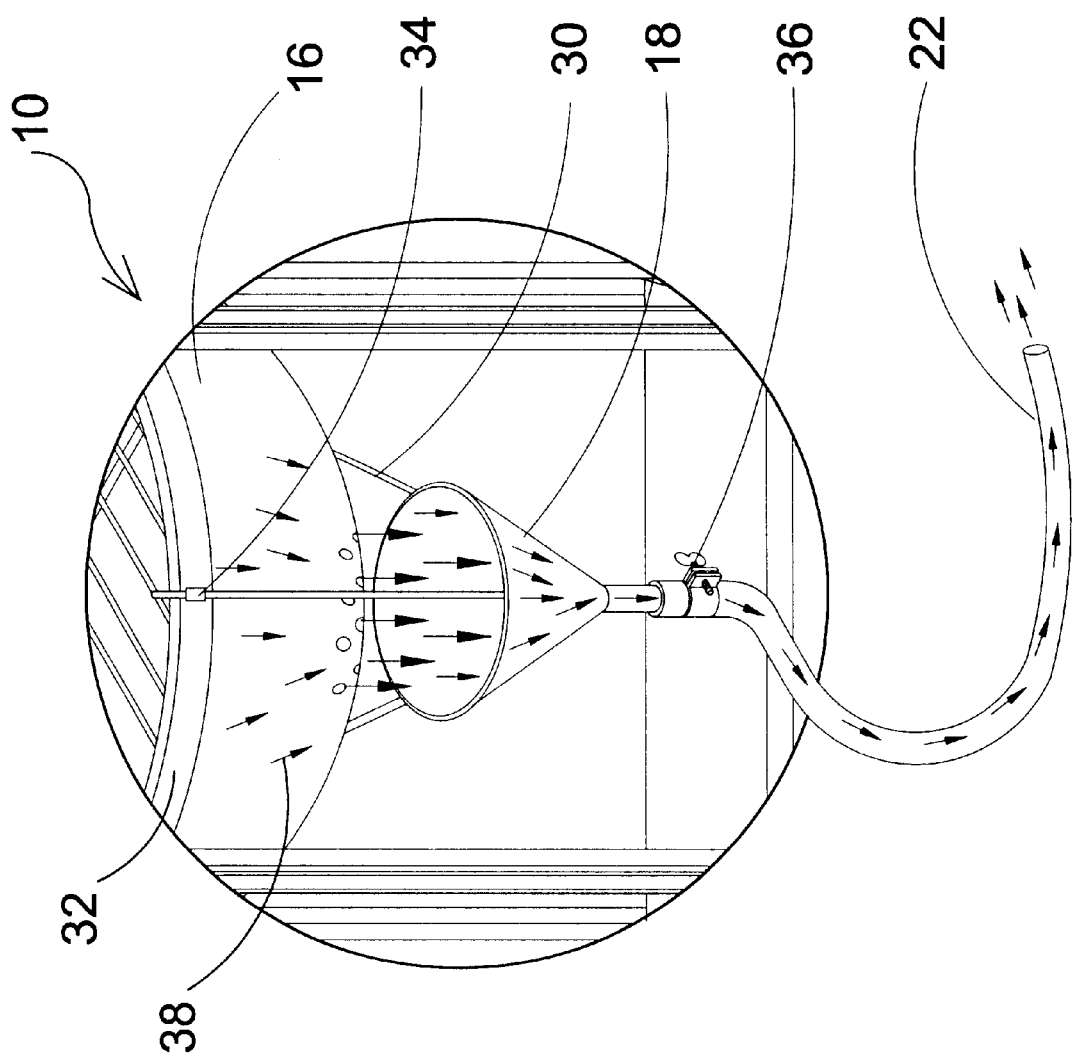
FIG. 4 is a detail view of the present invention.

Turning to FIG. 4, shown therein is a detail view of the present invention 10. Shown is the present invention with the funnel 18 attached to the upper outer rim or lip portion 32 of a barbecue grill 16 by means of a plurality of funnel harnesses 30 and funnel harness hooks 34. The direction arrows 38 indicate downward water flow. Also shown are the outlet or funnel hose 22 and the means of connecting 36 of hose 22 to the outlet end of funnel 18.

Figure 5:
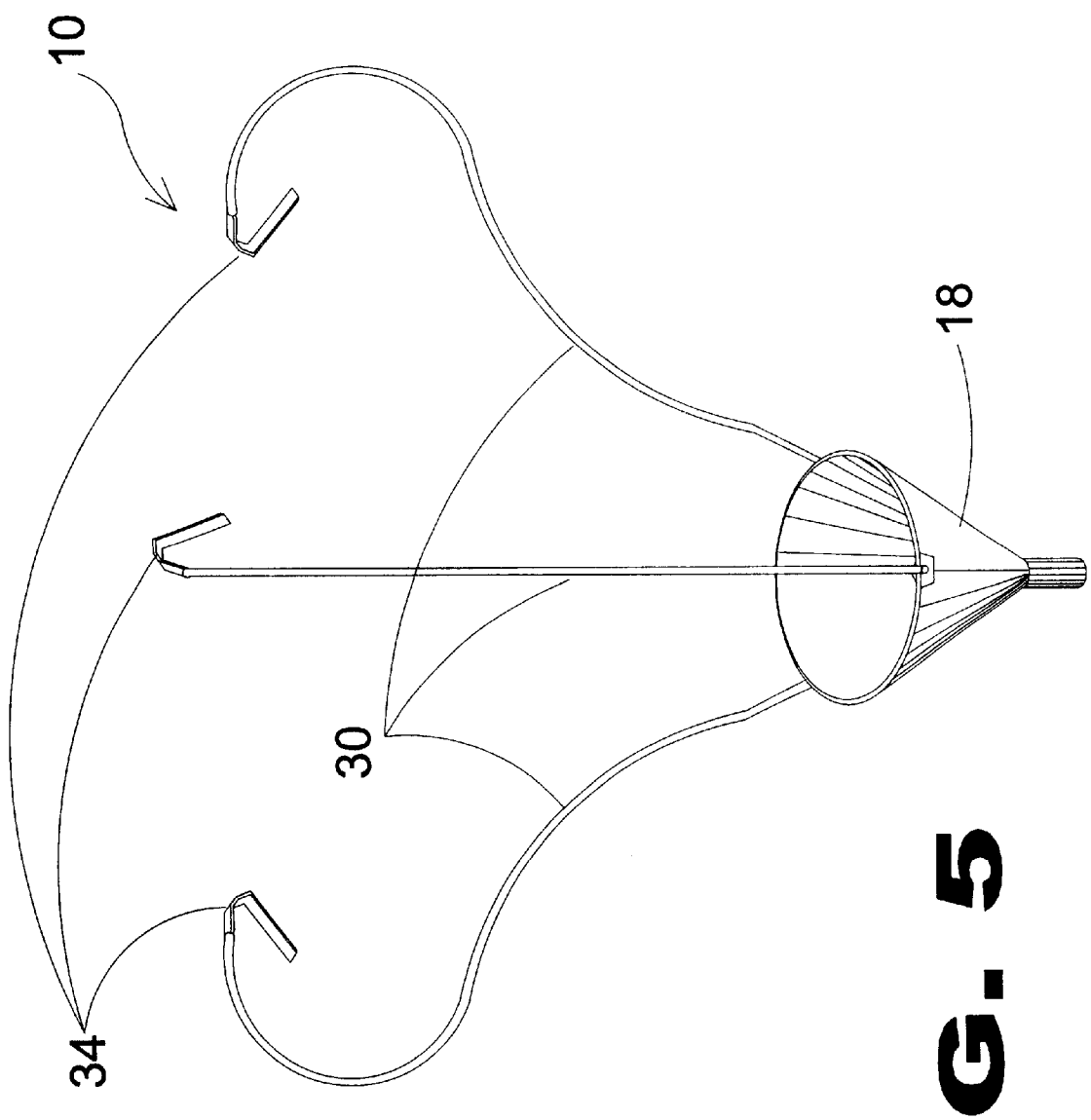
FIG. 5 is a perspective view of the present invention.

Turning to FIG. 5, shown therein is a perspective view of the present invention 10. Depicted is one way of attaching the funnel 18 to the barbecue grill using harness hooks 34 and straps or harness 30 connected to the lip of the enlarged inlet end of funnel 18.

Figure 6:
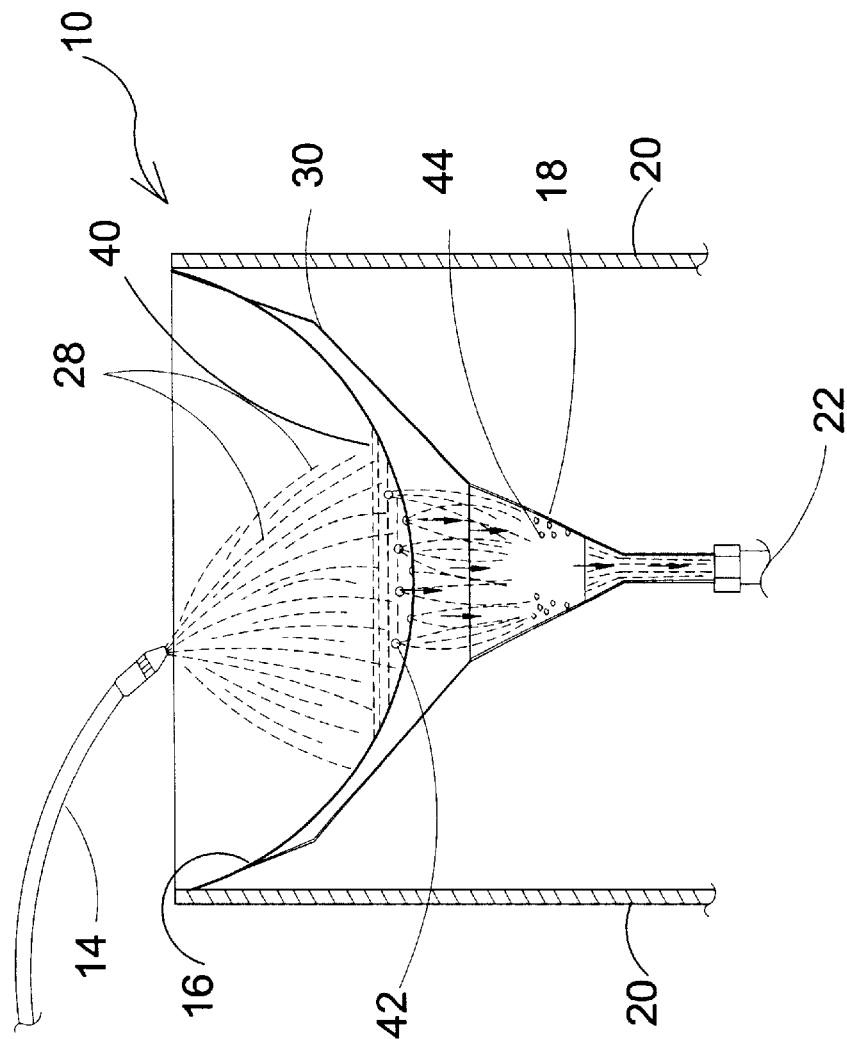
FIG. 6 is a sectional view of the present invention.

Turning to FIG. 6, shown therein is a sectional view of the present invention 10. The aquatic barbecue hot ash extinguisher and remover of the present invention, operates by spraying hose water 28 from a garden hose 14 onto the charcoal 40 lying in the bottom of grill 16. The resultant ash and water solution is washed out through the air duct holes 42 at the bottom of the upwardly concave grill 16 and into a funnel 18 that is suspended between the grills legs 20. The water and ash solution washes out through the funnel 18 and into a discharge hose 22 that leads away from the grill and onto the lawn or into the garden. When the water drains away, the spoil that is left is potash (potassium) that fertilizes the lawn or garden where it is discharged. Also shown are the funnel harness 30 and larger pieces of coal ash 44.

Figure 7:
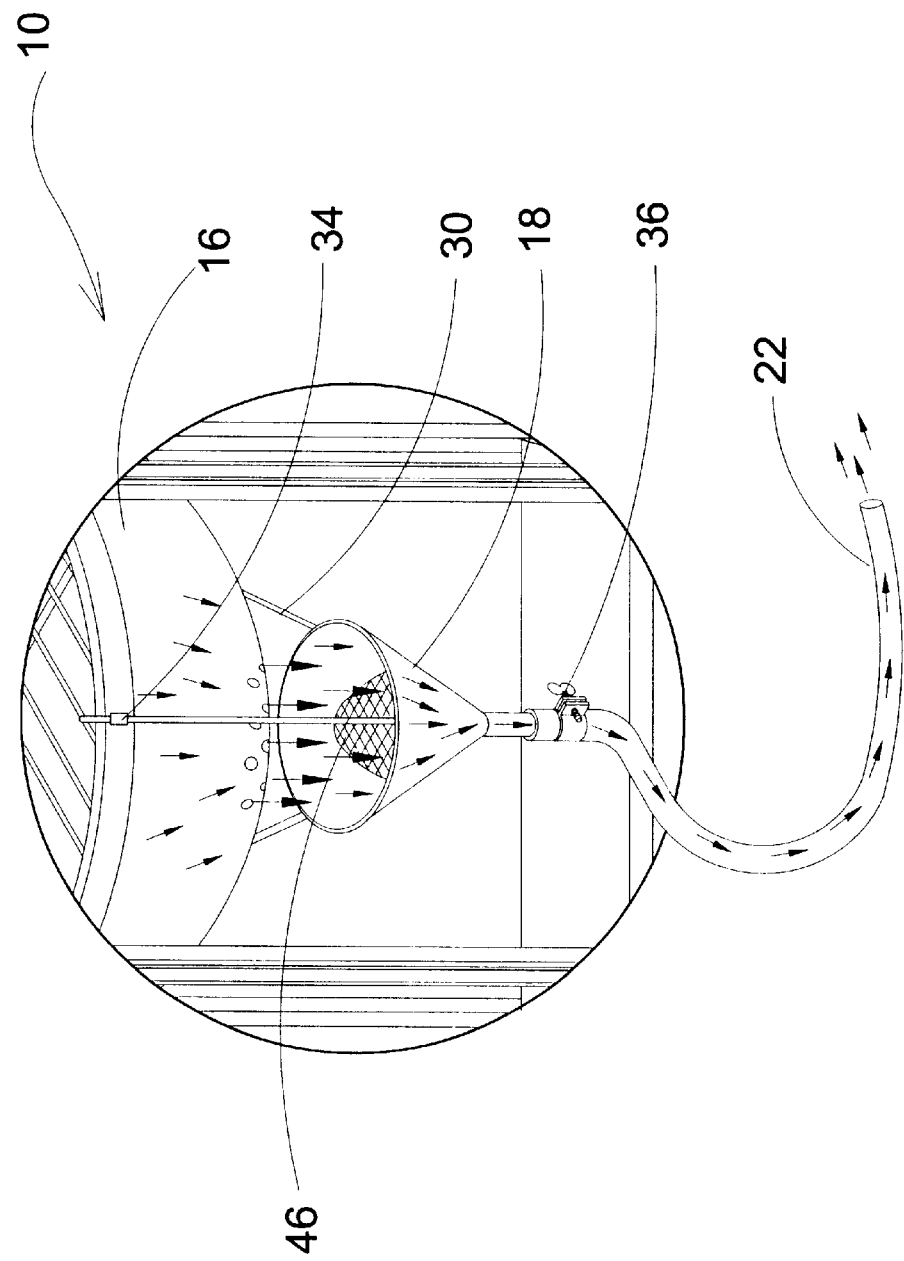
FIG. 7 is a detail view of the present invention.

Turning to FIG. 7, shown therein is a detail view of the present invention 10. The funnel portion 18 of the present invention may have a screen 46 of appropriate mesh size to separate larger particles whereby the fluid and ash will form a free flowing slurry. Other elements previously disclosed are also shown.

Figure 8:
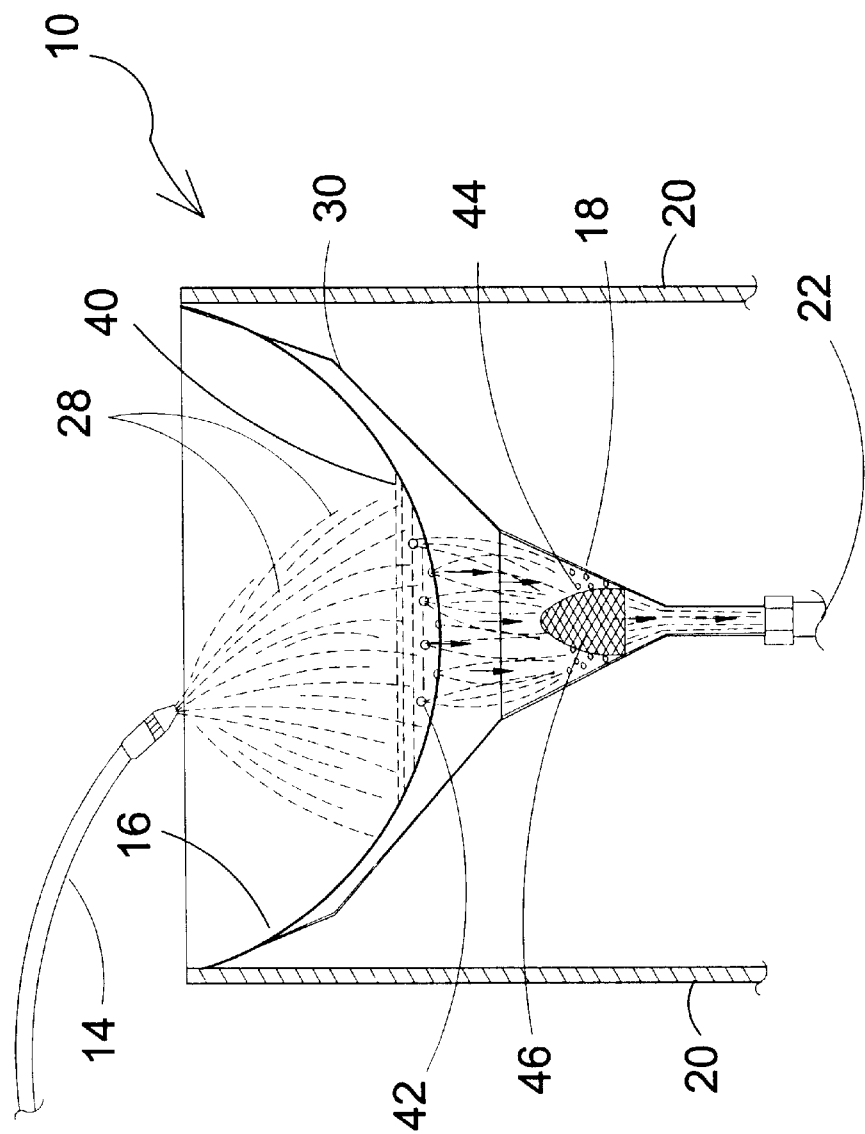
FIG. 8 is a sectional view of the present invention.

Turning to FIG. 8, shown therein is a sectional view of the present invention 10. The aquatic barbecue hot ash extinguisher and remover of the present invention, operates by spraying water 28 from a garden hose 14 onto the charcoal ashes 40. The resultant ash and water solution is washed out through the air duct holes 42 at the bottom of the grill 16 and into a funnel 18 that is suspended between the grills legs 20. The water and ash solution washes out through the funnel 18 and into a hose 22 that leads away from the grill 16 and onto the lawn or into the garden. When the water drains away, the spoil that is left is potash (potassium) that fertilizes the lawn or garden where it is discharged. Other elements previously disclosed are also shown.

Figure 9:
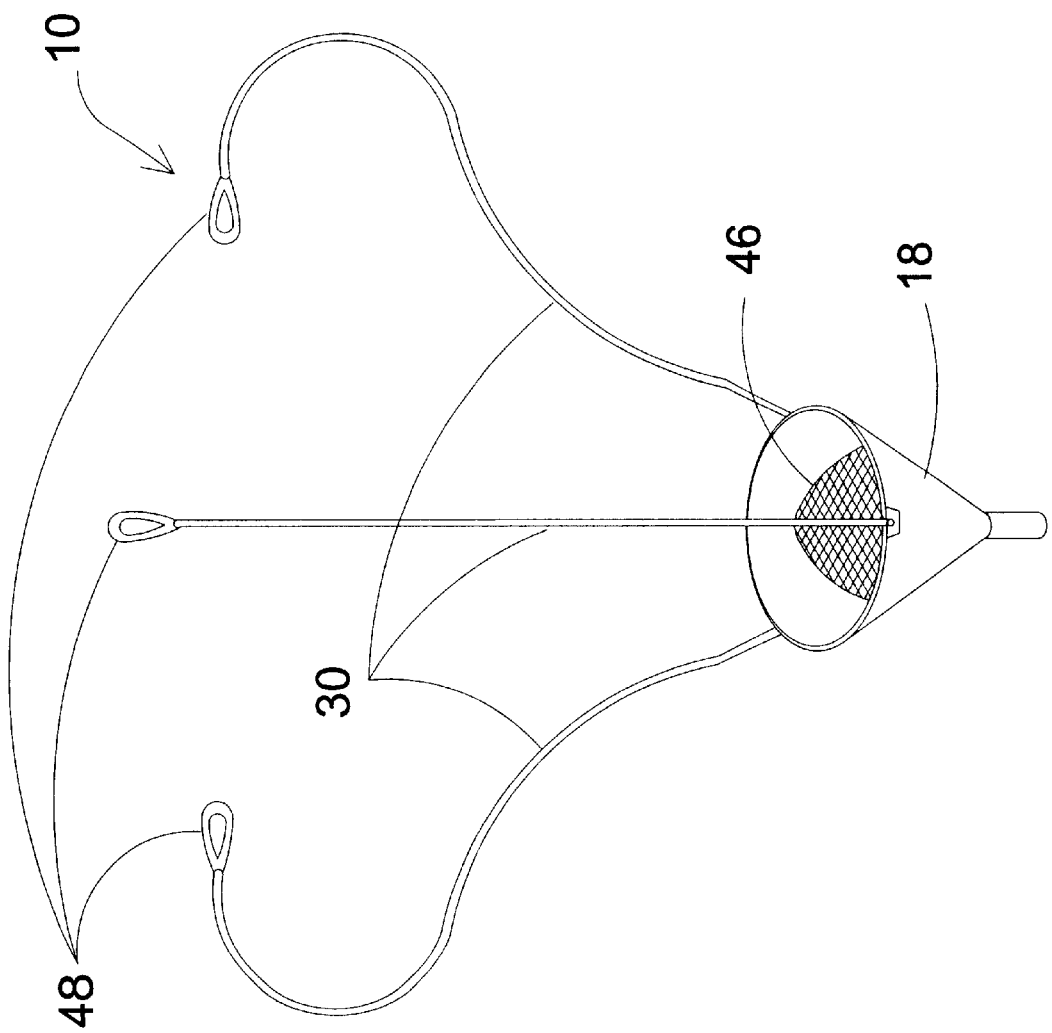
FIG. 9 is an alternate embodiment of the present invention funnel

Turning to FIG. 9, shown therein is an alternate embodiment of the means of attaching the present invention funnel 10. An alternate means of attachment is provided in the form of a loop means 48 in harness 30 that hooks to existing barbecue grill hardware or added attachment hardware such as screws or brackets. Also shown are the funnel 18 and filter screen 46.

Figure 10:
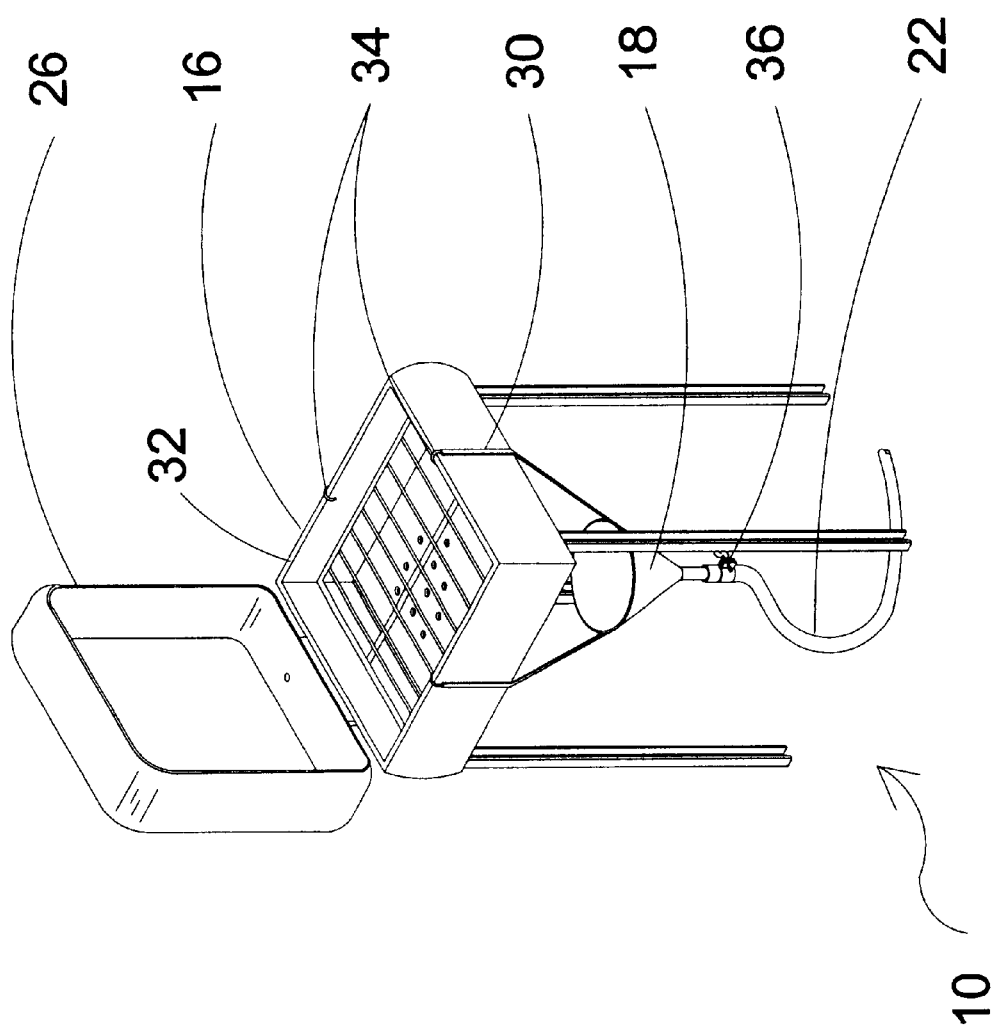
FIG. 10 is an alternate embodiment of the present invention.

Turning to FIG. 10, shown therein is an alternate embodiment of the present invention 10. The funnel unit 18 may also be attached to different types, shapes and size barbecue grill 16 units such as a round, square or rectangular grill. The attachment hardware hooks 34 are placed on the upper lip 32 of the barbecue grill 16 as the straps 30 maintain the funnel 18 in a suspended state. Other elements previously disclosed are also shown.

Figure 11:
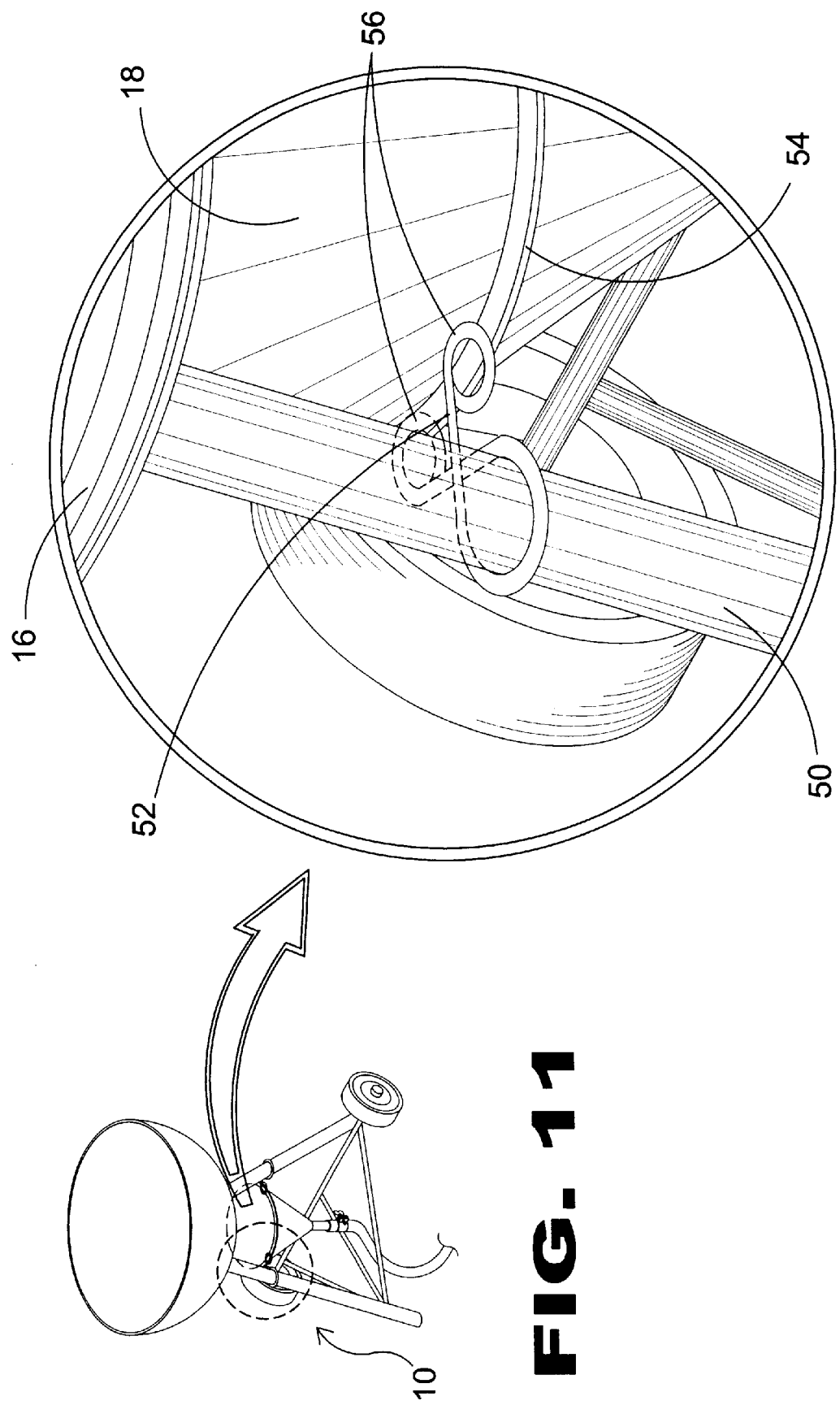
FIG. 11 is a detailed view of the present invention.

Turning to FIG. 11, shown therein is a detailed view of the present invention 10. Shown is the present invention attached to a barbecue grill 16 tripod leg stand 50 with the means of securement to the stand being a butterfly clip 52 means or other clip means that flexes so that its jaws 56 grasp the upper and lower portion of the funnel flange 54 which extends circumferentially around the outside enlarged end of the funnel. The jaws 56 of the clip means engage the flange 54 thereinbetween to secure the funnel 18 thereto.

Figure 12:
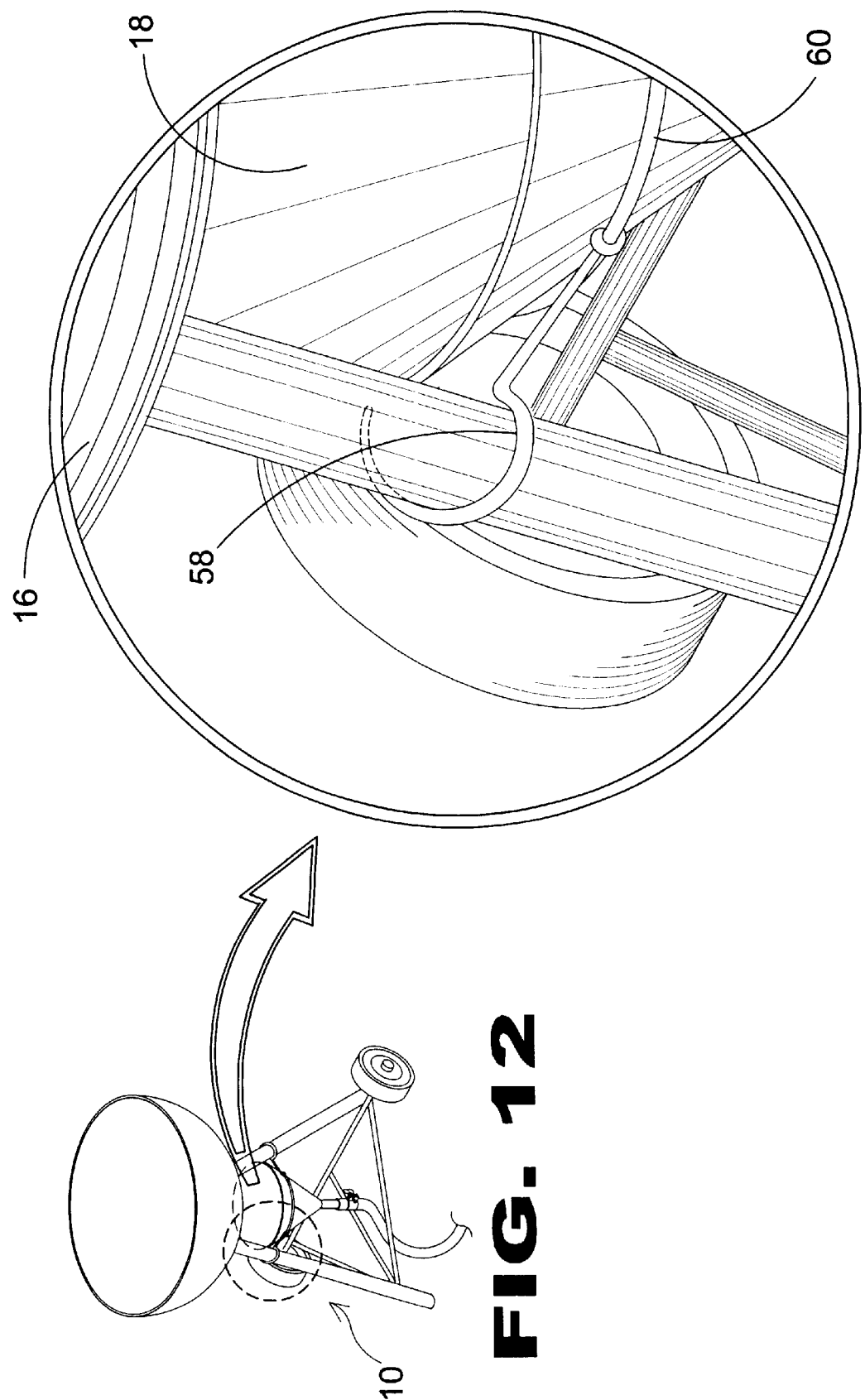
FIG. 12 is a detailed view of the present invention.

Turning to FIG. 12, shown therein is a detailed view of the present invention 10. Shown is the present invention 10 attached to a barbecue grill 16 tripod leg stand 50 with the means of securement to the stand being a plurality of attachment hooks 58 that are hooked onto the tripod legs 50 which hooks have the other eye end connected to a funnel ring 60 that is disposed around the outside of the funnel's enlarged end or lip. Other elements previously disclosed are also shown.

I claim:

1. An apparatus for removing the ash from a cooking grill using fluid flew, comprising:
   a) a cooking grill, said grill being upwardly concave having a bottom therein and a rim about an upper edge thereof;
   b) said bottom of said grill having a plurality of holes therein through which fluid can flow;
   c) a funnel disposed beneath said holes of said bottom of said grill for collecting the fluid, said funnel having an enlarged inlet end and a smaller outlet end;
   d) means for attaching said funnel beneath said grill comprising a harness fur attaching said funnel to said grill, said harness having a first end and a second end, said first end of said harness being connected to the enlarged end of said funnel and said second end of said harness being connected to said grill so as to secure said funnel beneath said holes in said grill;

e) a source of water directed from above onto the ash in said bottom of said grill for hydraulically removing the ash;

f) an outlet on said funnel;

g) means connected to said outlet for directing the water flow and ash to a position remote from said funnel;

h) a screen disposed in said funnel so that the screen will separate large ash pieces from the flow;

i) tripod legs supporting said grill;

j) said funnel having a flange disposed circumferentially about the outside of said enlarged end of said funnel; and k) wherein said harness is defined by a clip including said first end and said second end of the harness, said first end disposed on each tripod leg and said second end disposed on said flange.

2. The apparatus of claim 1, wherein said second end of said clip further comprises a pair of oppositely tensioned members, said oppositely tensioned members having said flange disposed thereinbetween so that said funnel is secured thereto.

3. The apparatus of claim 1, wherein said harness further comprises a ring disposed circumferentially about the outside of said enlarged end of said funnel.

4. The apparatus of claim 3, further comprising a hook, said hook having a first hook end and a second eye end, said hook connected to said ring by said second eye end and extending from said ring.

5. The apparatus of claim 4, wherein said first hook end is disposed about each said tripod leg.

6. The apparatus of claim 5, wherein said grill is a round grill.

7. The apparatus of claim 5, wherein said grill is a rectangular grill.

8. The apparatus of claim 7, if wherein said source of water is a hose.

9. The apparatus of claim 8, wherein said means connected to said outlet is a hose.

* * * * *